US009396260B2

(12) United States Patent
Castelli et al.

(10) Patent No.: US 9,396,260 B2
(45) Date of Patent: Jul. 19, 2016

(54) MANAGING MULTIPLE VIRTUAL WORLD ACCOUNTS FROM A SINGLE VIRTUAL LOBBY INTERFACE

(75) Inventors: Vittorio Castelli, Yorktown Heights, NY (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: KING.COM LTD., St. Julians (MT)

( * ) Notice: Subject to any disclaimer, the term of this patent is extended or adjusted under 35 U.S.C. 154(b) by 721 days.

(21) Appl. No.: 13/616,530

(22) Filed: Sep. 14, 2012

(65) Prior Publication Data

US 2013/0014034 A1 Jan. 10, 2013

Related U.S. Application Data

(63) Continuation of application No. 12/494,737, filed on Jun. 30, 2009, now Pat. No. 8,321,787.

(51) Int. Cl.
*G06F 3/048* (2013.01)
*G06F 17/30* (2006.01)

(52) U.S. Cl.
CPC ................... *G06F 17/30861* (2013.01)

(58) Field of Classification Search
CPC .................. G06F 17/30861; G06F 17/30017; G06F 17/3087; G06F 21/552; G06F 17/30607; G06F 17/3066; G06F 17/30702; G06F 17/3089; G06F 21/10; G06F 9/45558; G06F 17/2235; G06F 21/6272; G06F 9/4411
See application file for complete search history.

(56) References Cited

U.S. PATENT DOCUMENTS

| 7,580,861 | B1 | 8/2009 | Song |
| 8,161,397 | B2 | 4/2012 | Kalasapur et al. |
| 2001/0033675 | A1 | 10/2001 | Maurer |
| 2002/0138607 | A1 | 9/2002 | O'Rourke |
| 2002/0178072 | A1 | 11/2002 | Gusler et al. |
| 2005/0125229 | A1 | 6/2005 | Kurzweil |
| 2006/0059049 | A1 | 3/2006 | Morris et al. |

(Continued)

OTHER PUBLICATIONS

"Second Inventory Details", 3 Pages [Accessed on Jun. 2, 2009], [Available Online http://www.secondinventory.com/files/details.php].

(Continued)

*Primary Examiner* — William Bashore
*Assistant Examiner* — Rayeez Chowdhury
(74) *Attorney, Agent, or Firm* — Saul Ewing LLP

(57) ABSTRACT

A virtual lobby client automatically interfaces with multiple virtual world instances, each provided by a separate virtual world provider from among multiple virtual world providers, each interfaced with to access a separate virtual world account, to retrieve a separate selection of inventory items from each virtual world account. The virtual lobby client renders an inventory directory index of each separate selection of inventory items within a single lobby interface with at least one selectable option for managing each of the items in the inventory directory from the single lobby interface. The virtual lobby client renders, within the single lobby interface, a separate graphical portal for each virtual account, wherein entry of each of the separate graphical portals triggers the virtual lobby client to automatically open a virtual world specific interface window into a particular virtual world instance provided under the particular virtual world account associated with the entered graphical portal.

19 Claims, 6 Drawing Sheets

(56) References Cited

U.S. PATENT DOCUMENTS

| | | |
|---|---|---|
| 2006/0143091 A1 | 6/2006 | Yuan et al. |
| 2007/0003915 A1 | 1/2007 | Templeman |
| 2007/0124216 A1 | 5/2007 | Lucas |
| 2007/0250901 A1 | 10/2007 | McIntire et al. |
| 2008/0071750 A1 | 3/2008 | Schloter |
| 2008/0082424 A1 | 4/2008 | Walton |
| 2008/0255957 A1 | 10/2008 | Erdem et al. |
| 2008/0263460 A1* | 10/2008 | Altberg et al. ............ 715/757 |
| 2009/0008450 A1 | 1/2009 | Ebert et al. |
| 2009/0037905 A1 | 2/2009 | Hamilton, II |
| 2009/0043658 A1 | 2/2009 | Webb et al. |
| 2009/0119764 A1 | 5/2009 | Applewhite et al. |
| 2009/0171901 A1 | 7/2009 | Bathiche et al. |
| 2009/0209236 A1 | 8/2009 | Bloebaum et al. |
| 2009/0210483 A1 | 8/2009 | Pierce et al. |
| 2009/0216549 A1 | 8/2009 | Causey et al. |
| 2009/0253494 A1 | 10/2009 | Fitch et al. |
| 2010/0169799 A1* | 7/2010 | Hyndman et al. ............ 715/757 |
| 2010/0333031 A1 | 12/2010 | Castelli |
| 2011/0055927 A1* | 3/2011 | Hamilton et al. ............ 726/26 |

OTHER PUBLICATIONS

Notice of Allowance, U.S. Appl. No. 12/548,889, filed Aug. 27, 2009, In Re Rick A. Hamilton II, mailing date Jun. 25, 2009, 23 pages.
Non-final Office Action, U.S. Appl. No. 12/548,889, filed Aug. 27, 2009, Rick A Hamilton II et al., 28 pages, mailing date Jan. 18, 2012.
Non-final Office Action, U.S. Appl. No. 12/494,737, filed Jun. 30, 2009, Vittorio Castelli et all, 21 pages, mailing date Apr. 6, 2012.
Notice of Allowance, U.S. Appl. No. 12/494,737, filed Jun. 30, 2009, Vittorio Castelli et all, 12 pages, mailing date Jun. 22, 2012.
Notice of Allowance, mailing date Dec. 23, 2013, U.S. Appl. No. 13/619,688, filed Sep. 14, 2012, In re Hamilton II, 33 pages.
U.S. Appl. No. 13/619,688, filed Sep. 14, 2012, In re Hamilton II, 45 pages.

* cited by examiner

INVENTORY DIRECTORY INDEX 142

| UUID | VW ID | OBJECT ID | KEYWORD | MANAGEMENT OPTION |
|---|---|---|---|---|
| AA00BB11 | 1111A | 1 | PRODUCT PRESENTATION | VIEW/ TRANSFER/ COPY |
| AA00BB12 | 1111A | 2 | BRIEFCASE A | NO VIEW/NO TRANSFER/NO COPY |
| AA00BB13 | 1111B | 3 | BRIEFCASE B | VIEW/TRANSFER IN SAME/NO COPY |
| AA00BB14 | 2222A | 1 | AUDIO | RUN/TRANSFER/NO COPY |

*FIG. 4*

ACCOUNT CREDENTIALS INDEX 140

| VW ID | VW CREDENTIALS | LOBBY WORLD SPECIFICATIONS | SESSION ID |
|---|---|---|---|
| 1111A | USERNAME1/PW1 | MIRROR ENTRY | 1111A1 |
| 1111B | USERNAME2/PW2 | WINDOW ENTRY | 1111B1 |
| 2222A | USERNAME3/PW3 | CLOUD ENTRY | 2222A1 |

*FIG. 5*

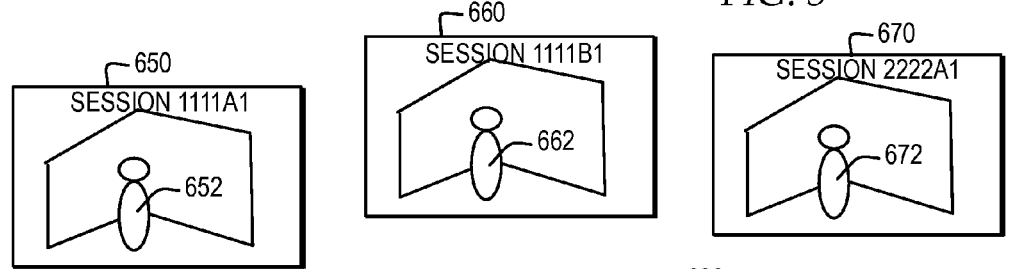

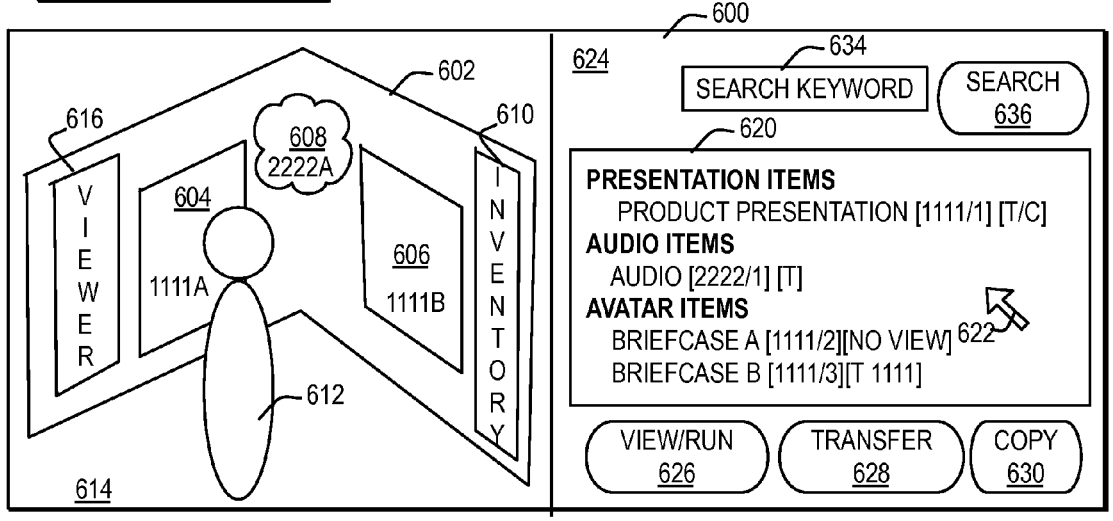

*FIG. 6*

MANAGING MULTIPLE VIRTUAL WORLD ACCOUNTS FROM A SINGLE VIRTUAL LOBBY INTERFACE

CROSS-REFERNCE TO RELATED APPPLICATIONS

This application is a continuation of commonly assigned U.S. patent application Ser. No. 12/494,737, filed Jun. 30, 2009.

BACKGROUND

1. Technical Field

This invention relates in general to virtual environments, and more particularly to a method, system, and computer program for providing a single virtual lobby interface for accessing and managing a user's virtual world inventories from across different virtual world accounts and controlling user entry into the different virtual world accounts.

2. Description of the Related Art

A virtual world, also commonly referred to as 3D Internet or a virtual universe, is a computer-based simulated environment in which one or more users traverse and interact within the environment. In a virtual world, a user is typically provided with an avatar to represent the user within the virtual world, where the user and other users can see the avatar. Virtual worlds are often simulated in a two or three-dimensional environment, including graphics, video, text, and other representations, which may, for example, resemble the real world, represent a fictitious world, or depict a gaming world.

Some virtual world providers allow a user to collect an inventory of items the user has bought, sold, created, interacted with, or traded during the user's interactions within the particular virtual world. For example, a virtual world called Second Life (Second Life is a registered trademark of Linden Research Inc.) is supported on the Second Life platform and supports a user collecting an inventory of items in association with the user's virtual world account with Second Life.

Over time, a user may collect a large number of inventory items in association with a single virtual world account. In addition, over time, a user may register for and maintain multiple virtual accounts with one or more virtual world providers, where each account has its own inventory that is only accessible to the user by the user separately logging into each virtual world account through a separate interface specified by each virtual world provider.

BRIEF SUMMARY

In view of a user maintaining multiple virtual world accounts each with a separate inventory of items, one or more embodiments of the invention provide a method, computer system, and computer program product for user access to different virtual world accounts and management of different virtual world account inventories through a single virtual lobby interface, as well as automatic entry into different virtual world accounts from a single virtual lobby interface.

In one embodiment, a method for managing a plurality of virtual world accounts is directed to a computer automatically interfacing with a plurality of virtual world instances, each provided by a separate virtual world provider from among a plurality of virtual world providers, each interfaced with to access a separate one from among a plurality of virtual world accounts, to retrieve a separate selection of inventory items from each of the plurality of virtual world accounts. The method is directed to the computer rendering an inventory directory index of each separate selection of inventory items collectively within a single lobby interface of the computer with at least one selectable option for managing each of the items in the inventory directory index from the single lobby interface. The method is directed to the computer rendering within the single lobby interface a separate graphical portal from among a plurality of graphical portals for each of the plurality of virtual accounts, wherein entry of each of the separate graphical portals from the single lobby interface triggers the computer to automatically open a virtual world specific interface window into a particular virtual world instance from among the plurality of virtual world instances provided under the particular virtual world account associated with the entered graphical portal.

In another embodiment, a computer system for managing a plurality of virtual world accounts comprises one or more processors and one or more computer-readable tangible storage devices. The computer system comprises program instructions, stored on at least one of the one or more storage devices for execution by at least one of said one or more processors, to automatically interface with a plurality of virtual world instances through a plurality of virtual world interfaces of the computer system, each of the plurality of virtual world instances provided by a separate virtual world provider from among a plurality of virtual world providers, each interfaced with through one of the plurality of virtual world interfaces to access a separate one from among a plurality of virtual world accounts to retrieve a separate selection of inventory items from each of the plurality of virtual world accounts. The computer system comprises program instructions, stored on at least one of the one or more storage devices for execution by at least one of said one or more processors, to render the inventory directory index of each separate selection of inventory items collectively within a single lobby interface of the computer system with at least one selectable option for managing each of the items in the inventory directory from the single lobby interface. The computer system comprises program instructions, stored on at least one of the one or more storage devices for execution by at least one of said one or more processors, to control rendering within the single lobby interface of a separate graphical portal from among a plurality of graphical portals for each of the plurality of virtual accounts, wherein entry of each of the separate graphical portals from the single lobby interface triggers the computer system to automatically open a virtual world specific interface window into a particular virtual world instance from among the plurality of virtual world instances provided under the particular virtual world account associated with the entered graphical portal.

In another embodiment, a computer program product for managing a plurality of virtual world accounts comprises one or more computer-readable tangible storage devices. The computer program product comprises program instructions, stored on at least one of the one or more storage devices, to automatically interface with a plurality of virtual world instances, each provided by a separate virtual world provider from among a plurality of virtual world providers, each interfaced with to access a separate one from among a plurality of virtual world accounts, to retrieve a separate selection of inventory items from each of the plurality of virtual world accounts. The computer program product comprises program instructions, stored on at least one of the one or more storage devices, to render the inventory directory index of each separate selection of inventory items collectively within a single lobby interface of the computer with at least one selectable option for managing each of the items in the inventory directory from the single lobby interface. The computer program product comprises program instructions, stored on at least one of the one or more storage devices, to render within the single lobby interface a separate graphical portal from among a plurality of graphical portals for each of the plurality of virtual accounts, wherein entry of each of the separate graphical portals from the single lobby interface triggers the computer to automatically open a virtual world specific interface window into a particular virtual world instance from among the plurality of virtual world instances provided under the particular virtual world account associated with the entered graphical portal.

BRIEF DESCRIPTION OF THE SEVERAL
VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 4 is a block diagram illustrating one example of entries within an inventory directory index;

FIG. 5 is a block diagram depicting one example of entries within an account credentials index;

FIG. 6 is a block diagram illustrating an example of a display window for the lobby GUI;

DETAILED DESCRIPTION

Figure 1:
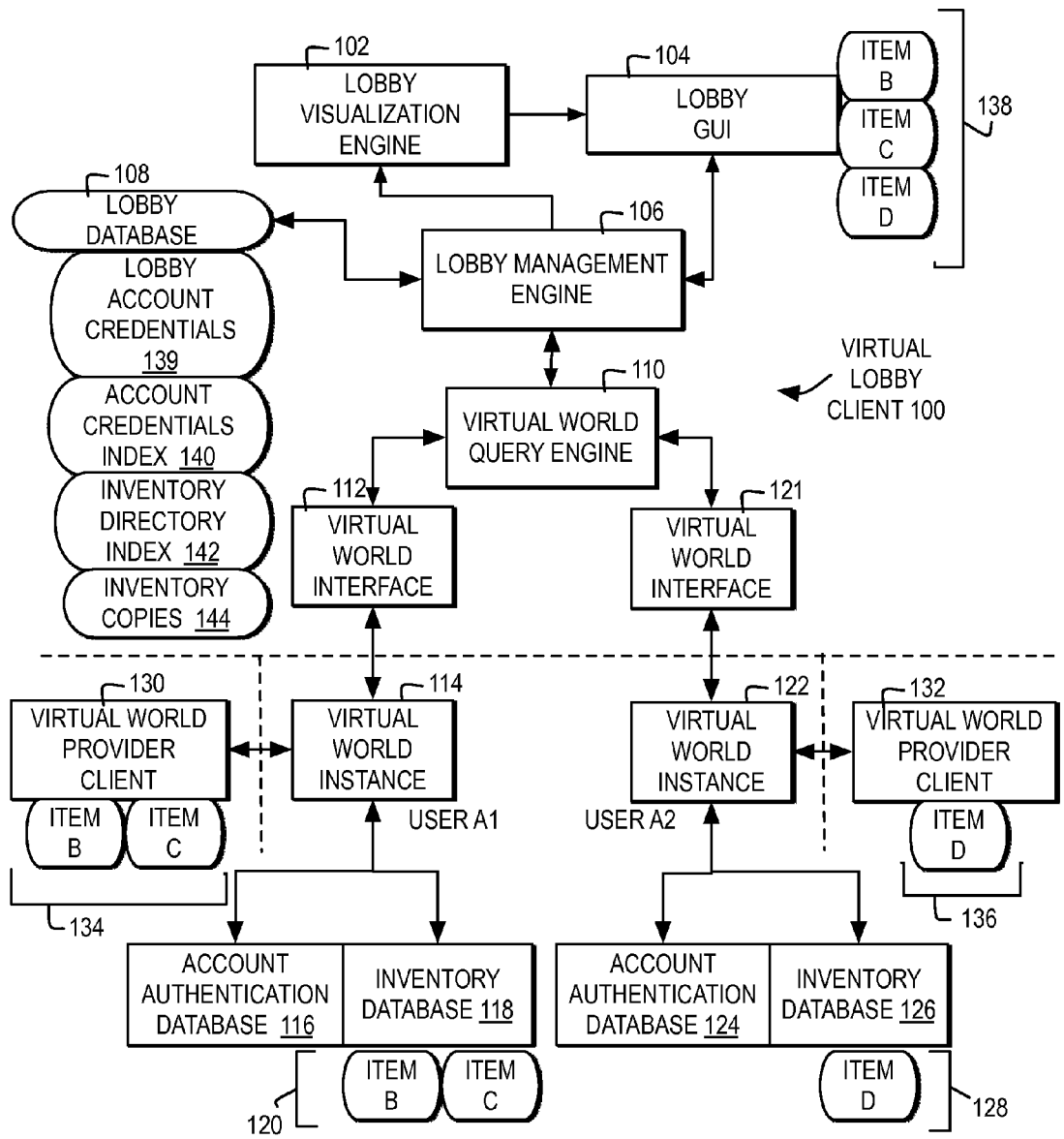
FIG. 1 is a block diagram depicting one embodiment of a virtual lobby client for providing a single virtual lobby interface for user access to and management of virtual world inventories accessed from different virtual world accounts hosted by one or more virtual world providers.

Referring now to FIG. 1, a block diagram depicts one embodiment of a virtual lobby client for providing a single virtual lobby interface for user access to and management of virtual world inventories accessed from different virtual world accounts hosted by one or more virtual world providers.

In the depicted example, virtual world instance 114 and virtual world instance 122 each represent the distributed engines, components, scripts, modules, and data for supporting one or more virtual world sessions for accessing one or more virtual worlds provided by one or more virtual world providers. A virtual world provides a simulated computing based environment, which may include two and three dimensional graphics, text, audio, video, and other elements in which a user interacts. A virtual world provider may be the provider of one or more of the hardware, software, or network elements of a virtual world. In particular, a virtual world provider may provide proprietary hardware, software, or network elements for a virtual world or may provide open source based hardware, software, or network elements for a virtual world. In addition, a virtual world provider may manage a virtual world platform on which one or more virtual worlds run, where the virtual worlds that run on the virtual world platform may be interoperable with one another but not interoperable with any other virtual worlds run on any other virtual world platforms provided by any other virtual world providers.

A virtual world provider of a virtual world may provide an interface, such as through virtual world provider client 130 or virtual world provider client 132, through which a user may register for a virtual world account and establish initial user account information. In another example, the virtual world provider may assign accounts for users and specify initial user account information. In particular, in the example, each of account authentication database 116 and account authentication database 124 may include user account information for one or more registered virtual world account users. Account authentication information may include one or more types of authentication data, such as a login identifier and password pair for each virtual world account, that a user must provide to receive permission to access the features of a virtual world instance opened for a session for each virtual world account.

When a user requests to login to a particular virtual world account, the virtual world provider hosting the particular virtual world account accesses an account authentication database, such as account authentication database 116 and account authentication database 124, and verifies that the login information entered by a user matches the account authentication information for the particular virtual world account. Upon authentication of the user login request, the virtual world provider invokes a virtual world instance for a session, such as one of virtual world instance 114 and 122 and accesses user account information for defining the user's interaction with the virtual world instance. Virtual world providers may identify each of virtual world instance 114 and virtual world instance 122 by a session ID or other type of identifier.

As illustrated, virtual world instance 114 and virtual world instance 122 access inventory database 118 and inventory database 126, respectively. Inventory database 118 and inventory database 126 each include inventories of one or more items associated with virtual world accounts. Inventory items may include, but are not limited to, any item that may be associated with a user virtual world account. Those of ordinary skill in the art will appreciate that inventory database 118 and inventory database 126 may be stored in one or more types of data storage structures in one or more computing systems, such as computing system 300 described with reference to FIG. 3.

In particular, inventory items included in inventory database 118 and inventory database 126 may include items represented by code, scripts, files, or other data, stored in multiple types of data storage systems. Inventory items may include executable software code that is renderable in a virtual world instance. In addition, inventory items may include nonexecutable data that may be used by a virtual world engine within a virtual world instance to render the inventory item. Particular examples of inventory items may include, but are not limited to, graphics files, sound files, animations, electronic documents, video files, avatar parts, avatar clothing, avatar tools, avatar gestures, calling cards, bookmarked locations, geographical information, note cards, photos, applications, textures, and deleted items. In addition, inventory items may include items shared by multiple users within a virtual world and items placed within landscapes or other structures of a particular virtual world environment.

For purposes of example, FIG. 1 is depicted with a virtual world instance 114 invoked by a virtual world provider for a virtual world account identified as "user A1" within account authentication database 116 and with a virtual world instance 122 invoked by a virtual world provider for a virtual world account identified as "user A2" within account authentication database 124. Examples of the inventory items associated with "user A1" in inventory database 118 are illustrated at reference numeral 120 as "item B" and "item C" and examples of inventory items associated with "user A2" in inventory database 126 are illustrated at reference numeral 128 as "item D". Those of ordinary skill in the art will appreciate that other embodiments may include additional or alternate virtual world instances and virtual account inventory items provided by one or more virtual world providers.

For purposes of illustrating virtual world provider clients, a user may log into a virtual world account identified as "user A1" with the associated virtual world account credentials through a virtual world provider client 130. In this example, virtual world provider client 130 interfaces with virtual world instance 114 to authenticate the user account information in account authentication database 116 and to provide the user with a graphical user interface for access into the virtual world accessible through virtual world instance 114, including the inventory for "user A1" in inventory database 118. In this example where the user accesses the virtual world account identified as "user A1" through virtual world provider client 130, the user is limited to accessing the inventory items in inventory database 118 within virtual world provider client 130. As illustrated, from within virtual world provider client 130, the user has access to "item B" and "item C" from inventory database 118 as illustrated at reference numeral 134, but does not have access to "item D" from inventory database 126. For purposes of example, virtual world provider client 130 is a virtual world provider specified client, specified by a particular virtual world provider for that provider's virtual world and does not provide an interface in which a user can access both virtual world accounts identified as "user A1" and "user A2" within a same interface. For the user to access inventory "item D" associated with the virtual world account identified as "user A2", the user may log in to the virtual world account identified as "user A2" through a virtual world provider client 132, separate from virtual world provider client 130, where virtual world provider client 132 is also a virtual world provider specified client that interfaces with virtual world instance 122 and provides the user with access to "item D" as illustrated at reference numeral 136.

A virtual lobby client 100 depicted in FIG. 1 includes a lobby graphical user interface (GUI)104. Lobby GUI 104 provides a single, uniform graphical user interface through which a user may access inventories across different virtual world accounts. In particular, lobby GUI 104 provides a single GUI through which a user may simultaneously access inventories retrieved from across multiple virtual world accounts. Lobby GUI 104 provides the methods for the user to interact with virtual lobby client 100. In another embodiment, virtual lobby client 100 may implement additional or alternate types of user interfaces that provide the methods for a user to interact with virtual lobby client 100.

In the example, virtual lobby client 100 illustrates providing a user access to the inventory items associated with "user A1" and "user A2" in both inventory database 118 and inventory database 126 collectively in an directory within a single lobby GUI 104, regardless of whether a same virtual world provider or different virtual world providers host the virtual world accounts identified as "user A1" and "user A2". In the example, virtual lobby client 100 provides a user with access to "item B", "item C", and "item D" within lobby GUI 104, as illustrated at reference numeral 138. As the number of inventory items associated with virtual world accounts identified as "user A1" and "user A2" in inventory database 118 and inventory database 126 increase, and as the user registers for additional virtual world accounts, rather than the user having to log in to each account through separate virtual world provider clients 130 and 132 and search each inventory separately, the user may search through and manage all inventory items from multiple virtual world accounts through a single entry into lobby GUI 104.

A virtual world provider, a virtual lobby provider, or other entity may specify virtual lobby client 100. For example, in one embodiment, a virtual lobby provider specifies virtual lobby system 100 to provide a single user interface through lobby GUI 104 for a user to enter into and access the inventories from both virtual world accounts identified as "user A1" and "user A2", where the virtual world provider or providers of virtual world accounts identified as "user A1" and "user A2" do not provide an interface in which both accounts can be simultaneously accessed from a single interface at a virtual world provider client or within a virtual world instance. In another embodiment, a virtual lobby provider may specify virtual lobby system 100 for providing an interface for multiple virtual worlds independent of any virtual world provider. In another embodiment, a virtual world provider may also be a virtual lobby provider of virtual lobby system 100 and provide users with a single virtual lobby interface from which the user may access virtual world account inventories from different virtual world providers.

As illustrated, virtual lobby client 100 includes a lobby visualization engine 102. Lobby visualization engine 102 generates the lobby environment rendered within lobby GUI 104. Lobby visualization engine 102 may render a directory of inventory items, such as a directory listing "item B", "item C" and "item D", within lobby GUI 104. Lobby visualization engine 102 may organize the directory of inventory items according to type of item, virtual universe account, and other criteria.

In addition, lobby visualization engine 102 may render inventory items within lobby GUI 104. In one example, lobby visualization end 102 renders business inventory items, such as documents and presentation files, from within lobby GUI 104 or launches a separate application to load and render the business inventory items. For example, lobby visualization engine 102 may include a viewing or editing application for rendering a document inventory item within lobby GUI 104 for user inspection or editing. In another example, lobby visualization engine 102 may automatically open a separate text editing application and load a document inventory item into the text editing application for user inspection.

In addition, lobby visualization engine 102 may include scripts, mapping tools, applications, and other components for rendering inventory items from different virtual worlds within the virtual lobby interface of lobby GUI 104. In one embodiment, lobby visualization engine 102 may render each inventory item within the lobby interface according to the format specified by the virtual world from which each inventory item originates, such that each inventory item is rendered within lobby GUI 104 in the same manner as if it were rendered within the originating virtual world. For example, a user may request to test how a script for an inventory item will run in a particular virtual world, while in the lobby GUI 104, before entering the particular virtual world for a business meeting where the inventory item will be visible to other users participating in the business meeting. In another embodiment, lobby visualization engine 102 may apply filters to inventory items to map inventory items into a uniform format renderable by lobby visualization engine within lobby GUI 104.

As illustrated, virtual lobby client 100 includes a lobby management engine 106. Lobby management engine 106 coordinates the operations of lobby visualization engine and lobby GUI 104 in coordination with operations of a lobby database 108 and a virtual world query engine 110. In particular, lobby management engine 106 waits for requests from lobby GUI 104 and invokes actions in lobby database 108, virtual world query engine 110, and lobby visualization engine 102 to complete the requests from lobby GUI 104. Lobby management engine 106 returns the results of requests to lobby GUI 104 directly or through lobby visualization engine 102.

Lobby database 108 includes information stored by lobby management engine 106 and other components in one more storage systems, cache, and memory. As illustrated, lobby database 108 includes lobby account credentials 139, account credentials index 140, inventory directory index 142, and inventory item copies 144. Those of ordinary skill in the art will appreciate that lobby database 108 may include additional or alternate types of data and references to data and that lobby database 108 may be stored in one or more types of data storage structures in one or more computing systems, such as computing system 300 described with reference to FIG. 3.

Lobby account credentials 139 may include a login identifier and password pair required for a user to login to lobby GUI 104 and to authenticate access to the login identifiers in account credentials index 140. In one example, lobby GUI 104 may display a login screen requiring user entry of a login identifier and password that match lobby account credentials 139 for access to any additional functions of or data managed by virtual lobby client 100.

Account credentials index 140 may include credentials for multiple virtual world accounts. For example, account credentials index 140 may include login identifier and password pairs to authenticate into each of the virtual world accounts "user A1" and "user A2".

Inventory directory index 142 may include item records for each of the virtual world inventory items from across multiple virtual world accounts. The item records in inventory directory index 142 may be accessed from one or more locations including, but not limited to, virtual world providers, virtual world item sellers, and local client storage systems.

Inventory copies 144 may include cached copies of inventory items and addresses or links to stored inventory items. In one example, lobby management engine may cache copies of "item B", "item C", and "item D" in inventory copies 144 so that whether a user is online or offline, the user may locally access "item B", "item C", and "item D" from lobby GUI 104 or from another interface. In one example, an object cached in inventory copies 144 is represented by an object descriptor file in eXtensible Markup Language (XML).

Virtual lobby client 100 implements multiple virtual world interfaces for establishing and managing communication between virtual lobby client 100 and each virtual world. In the example, a virtual world interface 112 of virtual lobby client 100 interfaces with virtual world instance 114 and a virtual world interface 121 of virtual lobby client 100 interfaces with virtual world instance 122.

Each of virtual world interface 112 and virtual world interface 121 communicate with a virtual world query engine 110 of virtual lobby client 100. Virtual world query engine 110 coordinates actions between lobby management engine 106 and the virtual world interfaces, such as virtual world interface 112 and virtual world interface 121. In particular, virtual world query engine 110 retrieves information from virtual world accounts for use by other components of virtual lobby client 100, such as by retrieving information from virtual world instance 114 through virtual world interface 112 and from virtual world instance 122 through virtual world interface 121.

Virtual world query engine 110 receives requests from lobby management engine 106 and implements a translation table or other method to convert each request into an account specific and virtual world specific request, executes each request through the specified virtual world interface for the specified virtual world account, and returns results to lobby management engine 106. Virtual world query engine 110 may modify results returned from virtual world interfaces to translate results into one or more formats compatible with lobby management engine standards. As illustrated in the example, if virtual world query engine 110 receives a request from lobby management engine 106 for the virtual world account identified by "user A1", then virtual world query engine 110 converts the request into a request for virtual world interface 112 and upon receipt of the result from virtual world interface 112, tags the result sent to lobby management engine 106 in association with the virtual world account identified by "user A1". In addition, virtual world query engine 110 may modify results returned from virtual world interfaces to generate a request for another virtual world interface.

Each virtual world interface of virtual lobby client 100, such as virtual world interface 112 and virtual world interface 121, may include one or more standardized interfaces and one or more proprietary interfaces specified for particular virtual world providers. Virtual world query engine 110 is enabled for one or more types of plug-ins, add-on, extensions or other types of interfaces through which additional, alternate, or upgraded virtual world interfaces can be added to virtual lobby client 100 and operate with virtual world query engine 110.

In initially establishing a separate virtual world session through each of virtual world instance 114 and virtual world instance 122, each of virtual world interface 112 and virtual world interface 121 may receive requests from virtual world query engine 110 with virtual world account credentials for accessing virtual world accounts identified as "user A1" and "user A2", respectively, such as from account credentials index 140. Each of virtual world interface 112 and virtual world interface 121 may submit the virtual world credentials through a login command line to login interfaces (not illustrated) of the virtual world providers hosting the virtual world accounts. For purposes of example, upon authentication of the virtual world account credentials from virtual world interface 112, the virtual world provider associated with virtual world interface 112 may invoke virtual world instance 114 for the virtual world account identified as "user A1" and upon authentication of the virtual world account credentials from virtual world interface 121, the virtual world provider associated with virtual world interface 121 may invoke virtual world instance 122 for the virtual world account identified as "user A2".

In addition, in initially establishing a separate virtual world session through each of virtual world instance 114 and virtual world instance 122, each virtual world provider may provide an option for virtual world interface 112 or virtual world interface 121 to establish separate virtual world sessions or access inventory items without entry within the virtual world environment and to designate a particular status within the virtual world visible to other users of the virtual world. For example, the host virtual world provider of virtual world instance 114 may allow virtual world interface 112 to log in to a particular virtual world account and set a status of "currently in the lobby" for the virtual world provider to indicate as the status of the particular virtual world account visible to other account holders. One of ordinary skill in the art will appreciate that any status supported within a virtual world instance may be updated from virtual world interface.

While in the example, virtual world instance 114 is illustrated as connected to both virtual world provider client 130 and virtual world interface 112 and virtual world instance 122 is illustrated as connected to both virtual world provider client 132 and virtual world interface 121, one of ordinary skill in the art will appreciate that once a session ID is established for a virtual world instance either through a login authorized through a virtual world provider client or through a virtual world instance, the session ID may be provided to another client or interface. In addition, one of ordinary skill in the art will appreciate that virtual world provider client 130 and virtual world provider client 132 are depicted for purposes of illustrating virtual world provider specified clients and are not meant to imply limitations in a functional embodiment virtual lobby client 100 interfacing with either of virtual world instance 114 or virtual world instance 122 alone.

As described, virtual world interface 112 and virtual world interface 121 provide functionality which allows a user to enter lobby GUI 104 and access inventories from multiple virtual world accounts through lobby GUI 104 without the user ever entering into any of the virtual world environments accessible through the virtual world accounts. In one example, a user initially enters lobby GUI 104 by entering user identifier and password pair matched by lobby management engine 106 to a lobby identifier and password credential in account credentials index 140. Once a user enters lobby GUI 104, lobby management engine 106 may automatically access the user's multiple virtual world account credentials in account credentials index 140 and request virtual world query engine 110 log into each of the virtual world accounts across multiple virtual world instances. Virtual world interface 112 and virtual world interface 121 each send login requests to virtual world providers which trigger virtual world sessions hosted by virtual world interface 114 and virtual world interface 122, respectively, and request to retrieve the inventory items associated with the logged into virtual world accounts. The login requests may send credentials from account credentials index 140 or may require data entry of credentials. Virtual world interface 112 and virtual world interface 121 return retrieved inventory items from inventory database 118 and inventory database 126, respectively, to virtual world query engine 110. Virtual world query engine 110 converts the results into a data format readable by lobby management engine 106. Lobby management engine 106 may store the accessed inventory items in lobby database 108 and direct lobby visualization engine 102 to refresh lobby GUI 104 with the accessible inventory items. In addition, upon user entry to lobby GUI 104, lobby management engine 106 may access previously stored inventory directory index 142 and inventory copies 144 from lobby database 108 and direct lobby visualization engine 102 to refresh lobby GUI 104 with the accessible inventory items.

In storing and managing inventory directory index 142 and inventory copies 144, lobby database 108 may store and search inventory items according to keywords. In addition, lobby GUI 104 may include a selectable interface in which a user may request to browse or to search the inventory items within lobby database 108 by keyword, virtual world providers, create date, last modified date, or any other meta data associated with the inventory items.

Upon user entry into lobby GUI 104 and virtual lobby client 100 automatically logging into multiple virtual world accounts, lobby visualization engine 102 may also generate elements rendered within lobby GUI 104 that each graphically represent a separate virtual world account accessible to a user within lobby GUI 104. For example, within lobby GUI 104, lobby visualization engine 102 may represent each of multiple virtual world accounts available to a user through a separate graphical door, separated area, or other graphical attribute. In one example, a user may be represented by an avatar within lobby GUI 104, where when the avatar walks towards or looks towards the area associated within a particular virtual world account in lobby GUI 104, lobby management engine 106 detects the position of the avatar and directs lobby visualization engine 102 to render the inventory list of inventory items associated with the particular virtual world account.

Virtual lobby client 100 also provides for a user to automatically enter a particular virtual world through a request made in lobby GUI 104. For example, as an avatar walks towards or looks at the area associated with a particular virtual world account in lobby GUI 104, lobby management engine 106 detects the positioning of the avatar as a request to enter a particular virtual world and manages opening a client interface window in which a user enters the virtual world session hosted for the virtual world account by a virtual world instance. In one example, lobby management engine 106 opens a virtual world specific interface window by triggering the virtual world provider client associated with the virtual world account to open an interface for the session ID or otherwise automatically logged with the virtual account credentials. In another example, lobby management engine 106 coordinates between virtual world query engine 110 and lobby visualization engine 102 to implement a virtual world specific interface window within lobby GUI 104 or separate from lobby GUI 104. In particular, by lobby management engine 106 controlling opening of a client interface window for a user to enter a virtual world environment for a particular virtual world account, a user only has to enter login information once, to enter lobby GUI 104, and then may effectively automatically log into and enter multiple virtual world accounts from lobby GUI 104 without having to separately enter the login information for each of the multiple virtual world accounts.

Virtual lobby client 100 may also control sharing of inventory items between virtual worlds. For example, sharing of inventory items may include virtual lobby client 100 managing transfer or copying of inventory items from one virtual world account to another virtual world account. From lobby GUI 104, a user may select to transfer a media file from virtual world account "user A1" from inventory database 118 to storage in inventory database 126 under virtual world account "user A2". In another example, a user may select to copy a business document accessible through virtual world account "user A1" to the virtual world account "user A2" so the user can access the same business document under both virtual world accounts. In particular, responsive to a user request within lobby GUI 104 to transfer or copy an inventory item lobby management engine 106 coordinates transfer or copy of the inventory item through virtual world query engine 110.

In storing and managing inventory items, lobby management engine 106 may also detect how inventory items can be managed and set management options for each inventory item record in lobby database 108. In particular, lobby management engine 106 may detect whether an inventory item can be viewed, shared, and stored and may detect whether there are restrictions on sharing a particular inventory item into a particular virtual world. Lobby visualization engine 102 may also graphically distinguish inventory items within lobby GUI 104 to indicate the management options for each inventory item.

Figure 2:
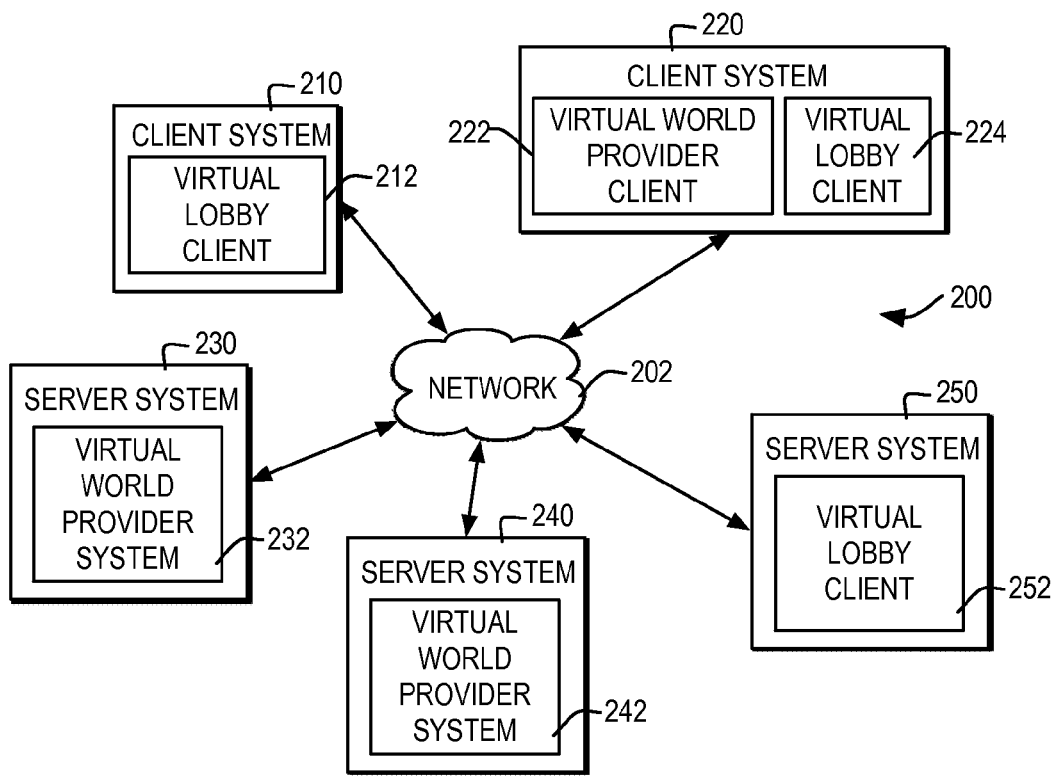
FIG. 2 is a block diagram illustrating one embodiment of a network environment in which a virtual lobby client is implemented.

With reference now to FIG. 2, a block diagram illustrates one embodiment of a network environment in which a virtual lobby client is implemented. One of ordinary skill in the art will appreciate that environment 200 is illustrative of one type of network environment that may support clients, servers and other components of a communication system. In addition, one of ordinary skill in the art will appreciate that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example, and may include routers, switches, gateways and other hardware to enable a communication channel between the systems connected via network 202. Network 202 may represent one or more of packet-switching based networks and telephony based networks, local area and wide area networks, public and private networks.

Network 202 and the systems communicatively connected within network environment 200 via network 202 may implement one or more layers of one or more types of network protocol stacks which may include one or more of a physical layer, a link layer, a network layer, a transport layer, a presentation layer, and an application layer. For example, network 202 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another.

Network environment 200 may implement multiple types of network architectures. In one example, network environment 200 may be implemented using a client/server architecture, where computing systems requesting data or processes are referred to as clients and computing systems processing data requests and processes are referred to as servers. In another example, network environment 200 may be implemented in a peer-to-peer network architecture. In yet another example, network environment 200 may be implemented in a grid architecture. Those of ordinary skill in the art will appreciate that other types of network architectures and combinations of network architectures may be implemented.

In the embodiment, as illustrated, a client system 210 and a client system 220 are communicatively connected via network 202 to a server system 230, a server system 240, and a server system 250. Each of client system 210, client system 220, server system 230, server system 240, and server system 250 may represent one or more computer systems, such as computer system 300 of FIG. 3, to be described below.

In the embodiment, one or more client systems and server systems within network environment 200 may host instances of virtual lobby client 100. In addition, in the embodiment, one or more client systems and server system within network environment 200 may host distributed instances of virtual lobby client 100. For example, in the embodiment, client system 210 hosts virtual lobby client 212, client system 220 hosts virtual lobby client 224 and server system 250 hosts virtual lobby client 252. Each of virtual lobby client 212, virtual lobby client 224, and virtual lobby client 252 may represent stand-alone software of virtual lobby client 100 or may represent distributed software. In one example, virtual lobby client 212 or virtual lobby client 224 may represent browser plug-ins, scripts, or other data and a browser for interfacing with virtual lobby client 252. Server system 250 may invoke multiple instances of virtual lobby client 100, such as virtual lobby client 252, with each instance of virtual lobby client 100 provided by a virtual lobby client provider from server system 250 for access by users at client systems via network 202.

In addition, in the embodiment, one or more client systems and server systems within network environment 200 may invoke virtual world instances. For example, server system 230 hosts virtual world provider system 232, which may host one or more instances of a virtual world provided by a first virtual world provider, and server system 240 hosts virtual world provider system 242, which may host one or more instances of a virtual world provided by a second virtual world provider. Each of virtual world provider system 232 and virtual world provider system 242 may represent one or more virtual world engines running atop one or more types of virtual world grids or infrastructures.

In one embodiment, server system 230 and server system 240 each represent a networked environment of multiple server systems and each of virtual world provider system 232 and virtual world provider system 242 operates program instructions of one or more virtual world engines. A virtual world provider provides the computer instructions or a copy of computer instructions to virtual world provider system 232 and virtual world provider system 242. Virtual world provider system 232 and virtual world provider system 242 each request memory allocations and other hardware resources from server system 230 and server system 240, respectively, each time a virtual world engine is invoked. By invoking and allocating hardware, virtual world provider system 232 and virtual world provider system 242 each create virtual world instances. Each virtual world instance interacts with one or more account authentication databases and inventory databases, such as account authentication database 116, account authentication database 124, inventory database 118, and inventory database 126, which may be hosted by server system 230, server system 240 or another system accessible via network 202. In general, each virtual world instance includes control and management functions for controlling at least one aspect of a virtual world including, but not limited to, the geography or terrain of the virtual world, scripts and objects. A virtual world instance provides specialized functions for a particular user when the virtual world instance exchanges information with databases and client interfaces.

In the embodiment, each of virtual lobby client 212, virtual lobby client 224, and virtual lobby client 252 may include a lobby GUI 104 that provides a single interface in which a user may access inventories from across multiple virtual world accounts. In one example, virtual lobby client 212 provides a single interface in which a user may access and manage inventories from a first virtual world account hosted by virtual world provider system 232 and from a second virtual world account hosted by virtual world provider system 242. In another example, virtual world provider client 222 hosted on client system 220 is specified to provide a user with a client interface to virtual world provider system 232 only, however virtual lobby client 224 hosted on client system 220 provides the user with a single interface in which a user may access and manage inventories from a first virtual world account hosted by virtual world provider system 232 and from a second virtual world account hosted by virtual world provider system 242.

In addition, each of virtual lobby client 212, virtual lobby client 224 and virtual lobby client 252 may include the lobby GUI 104 that provides a single interface from which a user may select to enter into one of multiple virtual worlds. In one example, virtual lobby client 224 provides a single interface through which a user may select to enter a virtual world hosted by virtual world provider system 232. In one example, when the user selects to enter the virtual world hosted by virtual world provider system 232 through virtual lobby client 224, virtual lobby client 224 automatically invokes virtual world provider client 222 to provide the interface for the user to interact within the virtual world instance hosted by virtual world provider system 232. In another example, any of virtual lobby client 212, virtual lobby client 224, and virtual lobby client 252 may incorporate virtual world provider client applications.

In one embodiment, virtual lobby client 212 or virtual lobby client 224 may locally store copies of inventory items accessed from across multiple virtual world accounts at client system 210 and client system 220, respectively. By locally storing copies of inventory items at client system 210 or client system 220, a user may access inventory items from across multiple virtual world accounts through virtual lobby client 212 or virtual lobby client 224 whether or not client system 210 or client system 220 is communicatively connected to network 202 or is offline.

In one embodiment, virtual lobby client 252 may locally store copies of inventory items accessed from across multiple virtual world accounts at server system 250. By locally storing copies of inventory items at server system 250, a user may access inventory items from across multiple virtual world accounts when logged into virtual lobby client 250 from any client system communicatively connected with server system 250 through network 202.

In facilitating management of inventories from across multiple virtual world accounts, virtual lobby client 212, virtual lobby client 224, or virtual lobby client 252 may provide for managing transfer or copying of items from association with one virtual world account to another virtual world account. For example, virtual lobby client 212 may facilitate transfer of a virtual item that is locally stored at client system 210, but associated with the virtual account hosted by virtual world provider system 232, to a virtual world account hosted by virtual world provider system 242.

Figure 3:
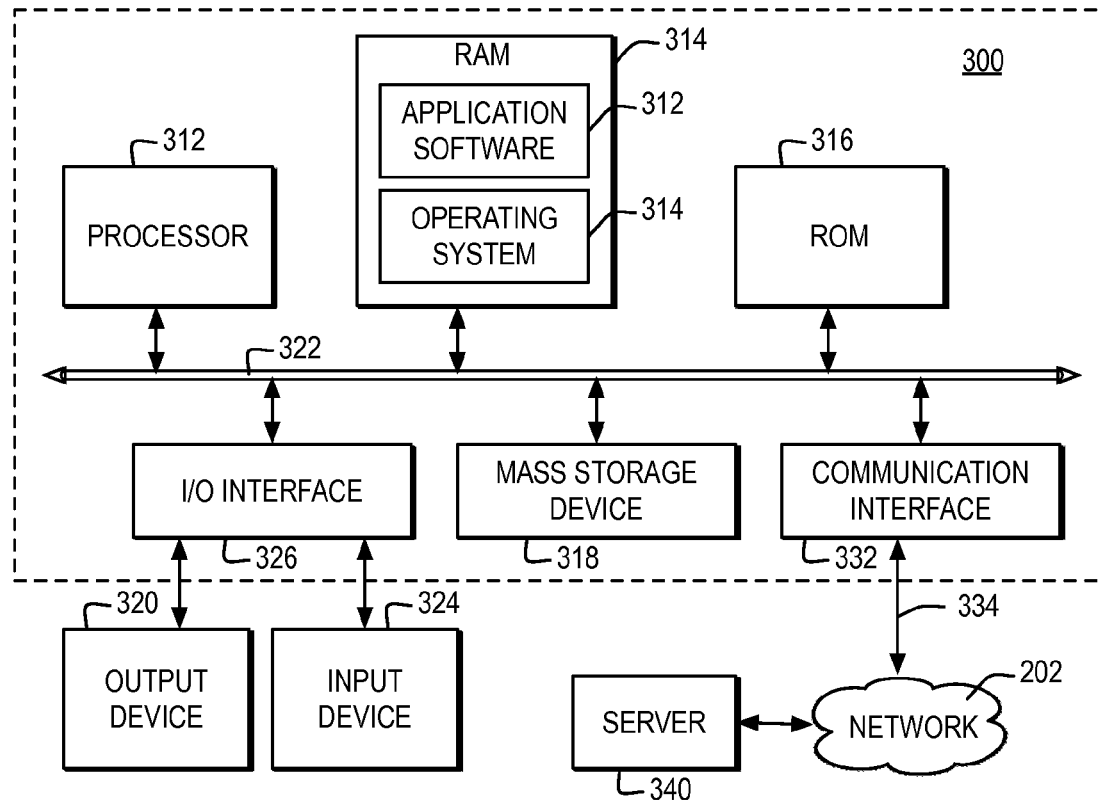
FIG. 3 is a block diagram depicting an example of a computer system in which the present invention may be implemented.

With reference now to FIG. 3, a block diagram illustrates an example of a computer system in which the present invention may be implemented. The present invention may be executed in a variety of systems and combinations of systems, made up of functional components, such as the functional components described with reference to computer system 300 and may be communicatively connected to a network, such as network 202.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC (PowerPC is a registered trademark of International Business Machines Corporation) processor that, during normal operation, processes data under the control of an operating system 314, application software 312, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control management of content displayed on portable, content adjustable identification devices as depicted in the operations of flowchart of FIGS. 7-12 and other operations described herein. Operations performed by processor 312 may be requested by operating system 314, application software 312, middleware or other code or the steps of the present invention might be performed by specific hardware components that contain hardwired logic for performing the steps, or by any combination of programmed computer components and custom hardware components.

As will be appreciate by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable tangible medium(s) may be utilized. The computer-usable or computer-readable tangible medium may be, for example but not limited to, an electronic, magnetic, optical, or semiconductor system, apparatus, or device. More specific examples (a non-exhaustive list) of the computer-readable tangible medium would include the following: a portable computer diskette, a hard disk, such as mass storage device 318, a random access memory (RAM), such as RAM 314, a read-only memory (ROM), an erasable programmable read-only memory (EPROM or Flash memory), a portable compact disc read-only memory (CDROM), an optical storage device, or a magnetic storage device. In the context of this document, a computer-usable or computer-readable tangible medium may be any medium that can store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 300, partly on the user's computer, as a stand-alone software package, partly on the user's computer and partly on a remote computer or entirely on the remote computer or server, such as a server 340. In the latter scenario, the remote computer may be connected to the user's computer through any type of network, such as network 202, through a communication interface 332 over a network link 334, that may be connected, for example, to network 202 including a local area network (LAN) or a wide area network (WAN), or the connection may be made to an external computer (for example, through the Internet using an Internet Service Provider). Although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 300, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 300, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, an image scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

With reference now to FIG. 4, a block diagram illustrates one example of entries within an inventory directory index. Those of ordinary skill in the art will appreciate that inventory directory index 142 may include one or more records and that the depicted example is not meant to imply limitations on the types of data which may be indexed for inventory items.

In the example, each record within inventory directory index 142 is identified by a Universally Unique Identifier (UUID), where a UUID is a 16-byte number which may be generated by a pseudorandom number generator. In the example depicted, the UUID only shows the first 8 hexadecimal digits of a 32 hexadecimal digital format. Each inventory item may be assigned a UUID that is tied to textual coordinates, graphic files, data files, audio files, scripts, and other data for each item.

In addition, in the example, each record within inventory directory index 142 is identified by a virtual world (VW) identifier (ID). In the example, the first three records are identified with a same virtual world provider identified by "1111" and the last record is identified with a different virtual world provider identified by "2222". As illustrated, inventory directory index 142 may include records for inventory items from virtual world accounts across multiple virtual world providers.

In addition, in the example, each VW ID includes a letter following the first four numbers assigned to a specific virtual world provider. The letter in the VW ID indicates a particular virtual world account. In the example, the first two records are identified with the virtual world provider identified by "1111" and the virtual world account "A", the third record is identified with the virtual world provider identified by "1111" and the virtual world account "B", and the fourth record is identified with the virtual world provider "2222" and the virtual world account "A". As illustrated inventory directory index 142 may also include records for inventory items from a same virtual world provider, but from different virtual world accounts hosted by the virtual world provider.

In one example, virtual world providers may register for a specific virtual world identifier applicable across all virtual lobby client instances. In another example, lobby management engine 106 may assign specific VW IDs to virtual world providers.

In the example, each record within inventory directory index is identified by an object ID and a keyword. In the example, numerical identifiers are used for object IDs and words are used for keywords. Lobby management engine 106 or lobby database 108 may search the data tied to a UUID for an inventory item to derive a keyword or may access keywords from the virtual world provider providing the inventory item or from a database accessible via network 202. In one example, lobby management engine 106 may identify keywords from the metadata tied to the UUID for an inventory item as specified by the virtual world provider. In another example, for an inventory item that is an audio file, lobby management engine 106 may access a music information database via network 202 to retrieve information about the audio file and index the retrieved information as one or more keywords in inventory directory index 142.

In addition, in the example, each record within inventory directory index 142 includes a management option, which includes an option to view or run an inventory item, to transfer an inventory item from one virtual world account to another virtual world account, and to copy an inventory item from a virtual world account. Lobby management engine 106 or lobby database 108 may identify management options specified within the data associated with a UUID for an inventory item. For example, lobby database 108 may identify that a record of an inventory item is stored, but the inventory item itself is not available, and specify that the inventory item is not viewable or runable. In addition, for example, lobby management engine 106 may identify that an inventory item is of a type which is not supported for viewing or running in lobby GUI 104 or by any accessible application and specify that the inventory item is not viewable or runable. In addition, for example, lobby management engine 106 or lobby database 108 may prevent transfer or copy options based on the share option rights in the code identified with a UUID for an inventory item, after querying the virtual world provider associated with an inventory item, after checking the encryption status of an inventory item, and after querying other searchable settings. Further, for example, lobby management engine 106 or lobby database 108 may enforce access and quality of service restrictions imposed by the virtual world provider, such as by degrading quality of an inventory item, preventing use of a specified schedule, and preventing access until a license agreement is established.

As illustrated, the management options for a first inventory item "product presentation" are for viewing, transferring, and copying the inventory item. The management options for a second inventory item "briefcase A" are for no viewing, no transferring, and no copying. The management options for a third inventory item "briefcase B" are for viewing, transferring to a different virtual world account provided by the same virtual world provider, and no copying. The management options for a fourth inventory item "audio" are for running the inventory item, which would include playing the inventory item, transferring the inventory item, and no copying.

Referring now to FIG. 5, a block diagram illustrates one example of entries within an account credentials index. Those of ordinary skill in the art will appreciate that account credentials index 140 may include one or more records and that the depicted example is not meant to imply limitations on the types of data which may be indexed for inventory items.

In the example depicted, each record in account credentials index 140 identifies a VW ID, VW credentials, and lobby world specifications. For purposes of example, the VW ID format illustrated in account credentials index 140 is the same format as the illustrated in inventory directory index 142. As will be further described with reference to FIG. 6, an application or user may specify "lobby world specifications" which specify preferences including, but not limited to, how a particular virtual world account is implemented in lobby GUI 104, the location of items within the lobby, the text to appear within the lobby, when the lobby is available, lists of buddies who are logged in or not logged in within different virtual worlds, and the option to display a record of the previous last entry or last synchronization of inventory items within the lobby interface.

In addition, in the example depicted, each recording in account credentials index 140 identifies a current session ID for a virtual world session hosted by a virtual world provider for each virtual world account. Lobby management engine 106 may store the actual current session ID assigned by a virtual world provider or may assign session IDs.

In the example depicted, for purposes of illustrating types of information which may be stored in account credentials index 140, a first record in account credentials index 140 for VW ID "1111A" is associated with VW credentials of "username1" and "PW1" where "PW1" is a password paired with "username1" for access to a first virtual world account hosted by the virtual world provider identified as "1111". The lobby world specifications set for VW ID "1111A" is "mirror entry", which governs the appearance and behavior of a graphical portal into the virtual world. A session ID of "1111A1" is stored with VW ID "1111A".

In addition, in the example depicted, a second record in account credentials index 140 for VW ID "1111B" is associated with VW credentials "username2" and "PW2" where "PW2" is a password paired with "username2" for access to a second virtual world account hosted by the virtual world provider identified as "2222". The lobby specifications set for VW ID "1111B" is "window entry", which governs the appearance and behavior of a graphical portal into the virtual world. A session ID of "1111B1" is stored with VW ID "1111B".

Further, in the example depicted, a third record in account credentials index 140 for VW ID "2222A" is associated with VW credentials "username3" and "PW3" where "PW3" is a password paired with "username3" for access to a virtual world account hosted by the virtual world provider identified as "2222A". The lobby world specification set for VW ID "2222A" is "cloud entry", which governs the appearance and behavior of a graphical portal into the virtual world. A session ID of "2222A1" is stored with VW ID "2222A".

With reference now to FIG. 6, a block diagram illustrates an example of a display window for the lobby GUI. In the example, a GUI window 600 includes a three-dimensional lobby world interface 614 and an inventory item interface 624, which are examples of interfaces controlled by lobby GUI 104. In the example, an avatar 612 represents a user's movements within lobby world interface 614 and a position of a pointer 622 represents a user's movements within inventory item interface 624. Those of ordinary skill in the art will appreciate that lobby world interface 614 and inventory item interface 624 may be integrated into a single interface and that additional or alternate interfaces may be included within GUI window 600 as controlled by lobby GUI 104.

In one example, as a user logs into lobby client system 100, either by transporting into lobby world interface 614, moving an avatar into lobby world interface 614, or providing log in information to a log in interface of lobby client system 100, lobby management engine 106 verifies the requested access credentials to virtual lobby client 100 against lobby account credentials 139 and upon authorization of the access credentials, opens or updates a window 600 displaying lobby world interface 614 and inventory item interface 624. In addition, lobby management engine 106 automatically accesses account credentials index 140 and invokes instructions to virtual world query engine 110 to trigger virtual world interfaces for each virtual world account in account credentials index 140 and to log into each of the virtual world accounts through the respective triggered virtual world interfaces. Lobby management engine 106 also automatically retrieves inventory directories and copies of inventory items, when available, through virtual world query engine 110, for each of the logged into virtual world accounts and may update inventory directory index 142 and inventory copies 144 with the results returned from each virtual world provider of each of the accessed virtual world accounts.

By lobby management engine 106 controlling automatic log in through multiple virtual world accounts, lobby management engine 106 may also provide portals into each of the virtual world accounts from lobby world interface 614. In the example, as illustrated, a wall 602 within lobby world interface 614 includes graphical elements of a mirror 604, a graphical window 606, and a cloud 608. As previously described with reference to FIG. 5, an application or user may set specifications for portals to virtual worlds from lobby GUI 104 within account credentials index 140. In the example, for a user to enter one of the virtual worlds accessed by lobby client system 100, the user positions avatar 612 with respect to the portal associated with the particular virtual world.

For example, as described with reference to the first record in FIG. 5, VW ID "1111A" includes a "mirror entry" specification. The "mirror entry" associated by lobby management engine 106 with VW ID "1111A" is mirror 604. If the user controls avatar 612 to walk into mirror 604, lobby management engine 106 will request opening a virtual world specific interface window 650 for the user to automatically enter an automatically logged in virtual world session for the virtual world account associated with VW ID "1111A".

In addition, as described with reference to the first record in FIG. 5, VW ID "1111B" includes a "window entry" specification. The "window entry" associated by lobby management engine 106 with VW ID "1111B" is graphical window 606. If the user controls avatar 612 to walk into graphical window 606, lobby management engine 106 will trigger instructions to open a virtual world specific interface window 660 for the user to enter an automatically logged in virtual world session for the virtual world account associated with VW ID "1111B".

For example, as described with reference to the first record in FIG. 5, VW ID "2222A" includes a "cloud entry" specification. The "cloud entry" associated by lobby management engine 106 with VW ID "2222A" is cloud 608. If the user controls avatar 612 to look at cloud 608, lobby management engine 106 will trigger instructions to open a virtual world specific interface window 670 for the user to enter an automatically logged in virtual world session for the virtual world account associated with VW ID "2222A".

As illustrated in each of virtual world specific interface window 650, virtual world specific interface window 660, and virtual world specific interface window 670, each virtual world session, hosted by a separate virtual world instance, includes a separate avatar, such as avatar 652, avatar 662, and avatar 672 representative of the user within each separate virtual world session. In the example, virtual world specific interface window 650, virtual world specific interface window 660, and virtual world specific interface window 670 are each illustrated as separate windows controlled either by virtual world provider clients or virtual lobby client 100, however in other embodiments, any of virtual world specific interface window 650, virtual world specific interface window 660 and virtual world specific interface window 670 may be opened within window 600.

In addition to mirror 604 graphically appearing as a reflective mirror within lobby world interface 614, lobby management engine 106 responds to a user controlling an avatar to look at mirror 604 to view a reflection displaying what the user avatar will look like under a particular virtual world account associated with the mirror based on the inventory items accessed by lobby management engine 106 for the particular virtual world account from the provider of the particular virtual world account.

In addition to graphical window 606 graphically appearing as a transparent window within lobby world interface 614, lobby management engine 106 responds to a user controlling an avatar to look at graphical window 606 to view an image, collection of images, or video stream displaying what the virtual world environment currently accessible under a particular virtual world account associated with the window looks like at present or in the past.

Of the inventory items retrieved from the multiple virtual world accounts, a user may select to view the retrieved inventory directories cumulatively within inventory item interface 624 or lobby management engine 106 may automatically instruct display of accessed inventory directories in inventory item interface 624. In addition, lobby world interface 614 may include a graphical trigger for inventory items, such as inventory trigger 610, which when selected by avatar 612, triggers a display of inventory items in inventory item interface 624. Although not displayed, lobby management engine 106 may also respond to a selection by avatar 612 of inventory trigger 610 by placing a viewable list of inventory items within lobby world interface 614.

From inventory item interface 624, a user may select a particular inventory item from inventory item directory 620 through positioning pointer 622 and entering an input to select the item positioned under pointer 622. In the example illustrated inventory item directory 620 includes selectable entries from inventory directory index 142, listed by keyword, VW ID, object ID, and share option, where share options are abbreviated with "T" representing "transfer" and "C" representing "copy".

As illustrated a user may select to manage inventory items within inventory item directory 620 by selecting a particular inventory item within inventory item directory 620 and then selecting to view the item by selecting view/run option 626, to transfer the item by selecting transfer option 628, and to copy the item by selecting copy option 630. Upon user selection of a particular inventory item, lobby management engine 106 may adjust which of view/run option 626, transfer option 628, and copy option 630 are actually selectable based on the viewing and sharing options for a particular item. It will be understood that additional or alternate options may be provided.

In one example, upon user selection of view/run option 626, lobby management engine 106 may trigger placement of the selected item or running the inventory item within lobby world interface 614 or may trigger an application to open for viewing the particular item or running the script for the particular item. In one example, where lobby management engine 106 triggers placement of the selected item within lobby world interface 614, lobby world interface 614 may include one or more viewing interfaces, such as viewer 616, in which lobby management engine 106 may instruct lobby visualization engine 102 to render or run an inventory item. In addition, where lobby management engine 106 triggers placement of the selected item within lobby world interface 614, lobby management engine 106 may instruct rendering of an inventory item on avatar 612, within mirror 604, within graphical window 606, or within other interfaces within lobby world interface 614.

In addition, as illustrated, a user may request to search through the inventory items listed within inventory item directory 620 by keyword. In particular, a user may enter a search keyword as illustrated at reference numeral 634 and selection search option 636 to trigger lobby management engine 106 to search inventory directory index 142 by keyword and return the results of items indexed with keywords matching the search keyword within inventory item interface 624.

Figures 7, 8:
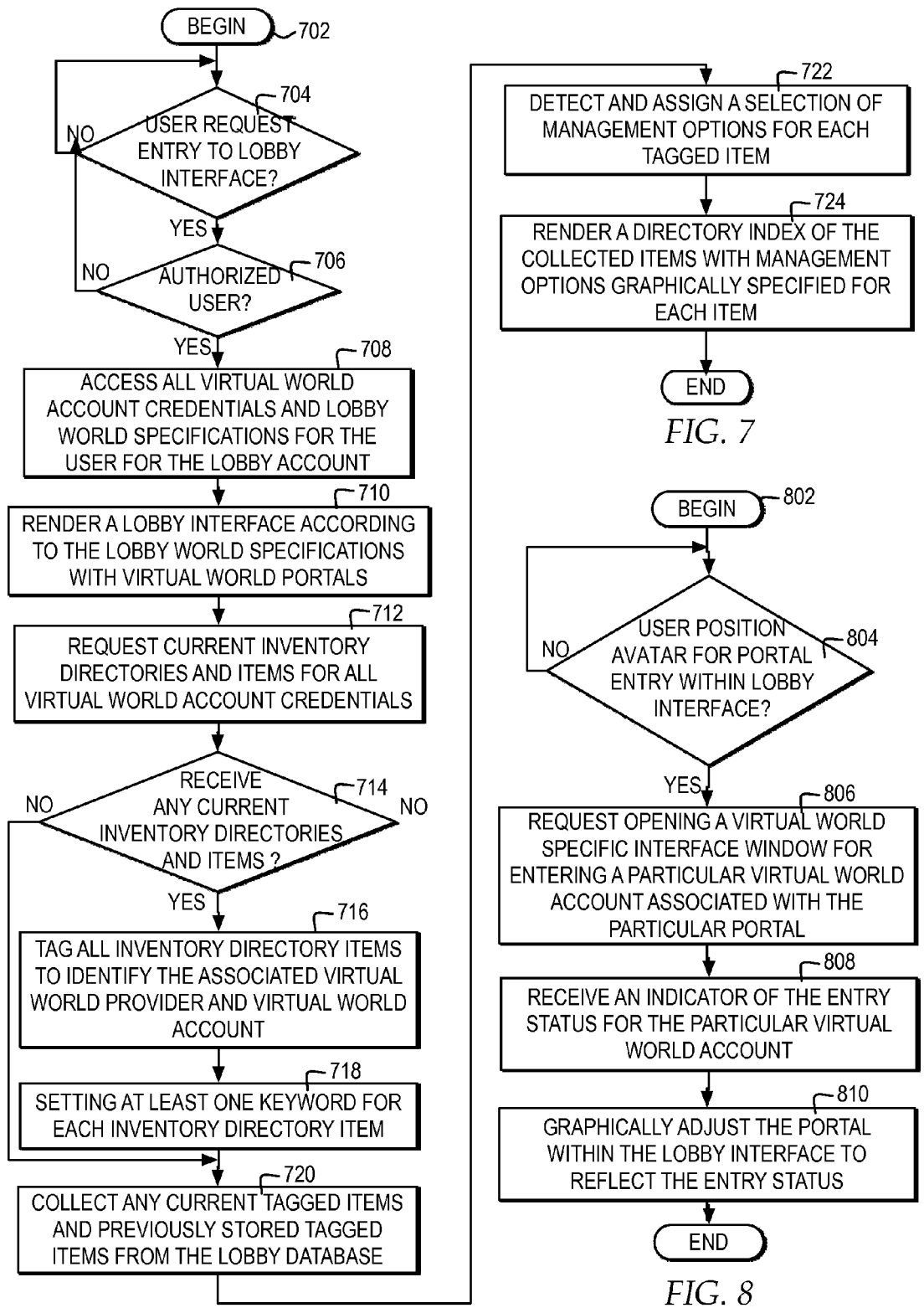
FIG. 7 is a high level logic flowchart depicting a process and program for a virtual lobby client managing access to multiple virtual world accounts and the inventories across multiple virtual world accounts from a single lobby interface.
FIG. 8 is a high level logic flowchart illustrating a process and program for a virtual lobby client managing access to a particular virtual world account from a virtual lobby interface.

Referring now to FIG. 7, a high level logic flowchart depicts a process and program for a virtual lobby client managing access to multiple virtual world accounts and the inventories across multiple virtual world accounts from a single lobby interface. In the example, the process, which may be performed by one or more of lobby visualization engine 102, lobby GUI 104, and lobby management engine 106, begins at block 702 and thereafter proceeds to block 704. Block 704 illustrates a determination whether a user requests to enter a lobby interface. Once a user requests entry to a lobby interface, the process passes to block 706. Block 706 depicts a determination whether the user is an authorized user. In one example, a user is identified as an authorized user if the user provides a login information which matches the lobby account credentials. If the user is an authorized user, then the process passes to block 708. Block 708 illustrates accessing all virtual world account credentials and lobby world specifications for the user for the virtual lobby account from the lobby database. Next, block 710 depicts rendering a lobby interface according to the lobby world specifications with virtual world portals for each virtual world account. Thereafter, block 712 illustrates requesting the current inventory directories and items for all virtual world accounts, and the process passes to block 714.

Next, block 714 depicts a determination whether any current inventory directories and items are received. If current inventory directories or items are received, then the process passes to block 716. Block 716 depicts tagging each inventory directory item to identify the associated virtual world provider and virtual world account. Next, block 718 illustrates setting at least one keyword for each inventory directory item. Thereafter, block 720 depicts collecting any current tagged items and previously stored tagged items from the lobby database. Next, block 722 illustrates detecting and assigning a selection of management options for each tagged item. Thereafter, block 724 depicts rendering a directory index of the collected items with management options graphically specified for each item, and the process ends.

Returning to block 714, if no current inventory directories or items are received, either because the virtual lobby client is offline or because the virtual lobby account inventories are empty, then the process passes to block 720.

With reference now to FIG. 8, a high level logic flowchart illustrates a process and program for a virtual lobby client managing access to a particular virtual world account from a virtual lobby interface. In the example, the process starts at block 802 and thereafter proceeds to block 804. Block 804 illustrates a determination whether a user positions an avatar for entry into the particular portal within the lobby interface. If a user positions an avatar for entry into a particular portal, the process passes to block 806. Block 806 depicts requesting opening a virtual world specific interface window for the particular virtual world account associated with the particular portal for the user to enter a virtual world environment of the virtual world session hosted for the particular virtual world account without the user having to separately enter the virtual world account credentials for the particular virtual world account. Thereafter, block 808 illustrates receiving an indicator of the entry status for the particular virtual world account. Next, block 810 depicts adjusting the graphical representation of the portal within the lobby interface to indicate whether the user has entered the particular virtual world account, and the process ends.

Figure 9:
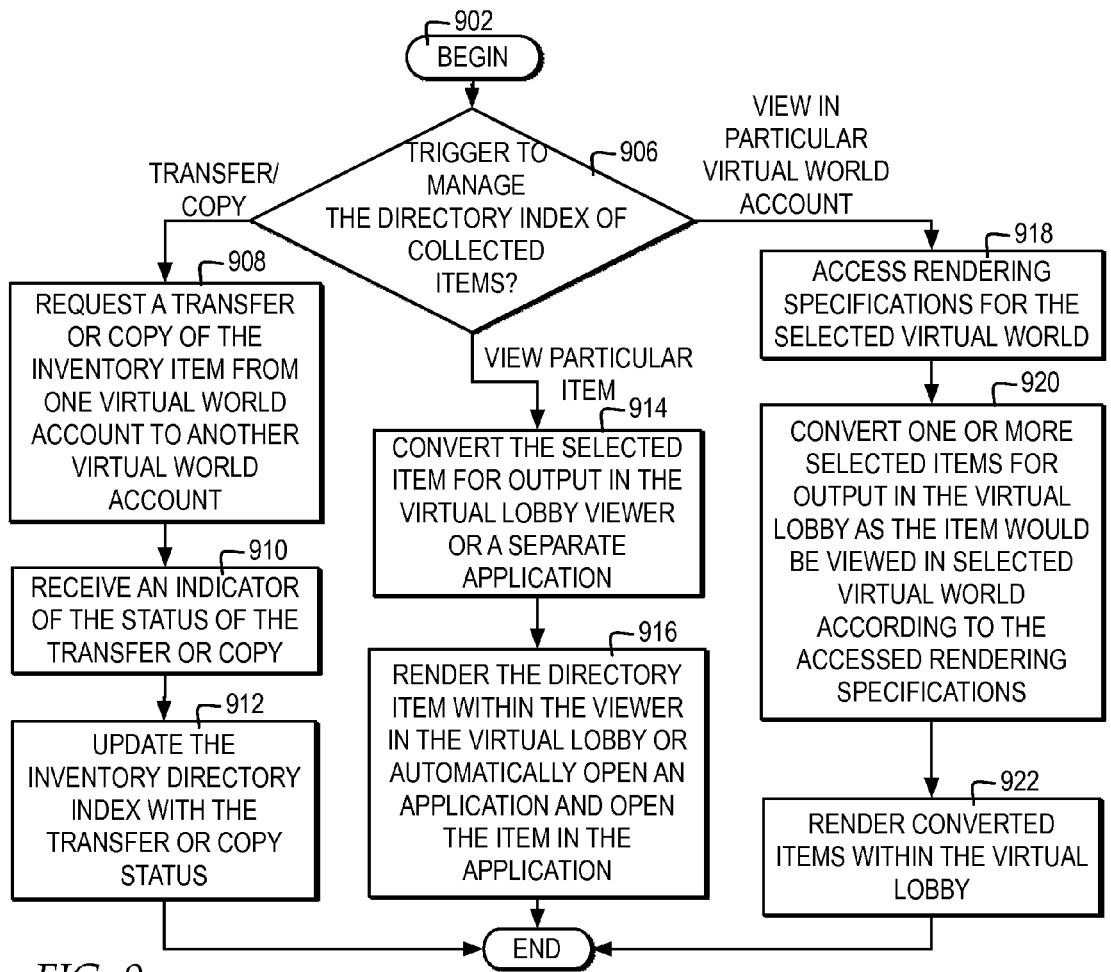
FIG. 9 is a high level logic flowchart depicting a process and program for a virtual lobby client for responding to triggers to manage inventory items from the virtual lobby interface.

Referring now to FIG. 9, a high level logic flowchart depicts a process and program for a virtual lobby client for responding to triggers to manage inventory items from the virtual lobby interface. In the example, the process starts at block 902 and thereafter proceeds to block 906. Block 906 depicts a determination of what type of trigger a lobby management engine detects.

In the example, at block 906, if the lobby management engine detects a transfer or copy request from the lobby GUI, then the process passes to block 908. Block 908 illustrates requesting a transfer or copy of the inventory item from one virtual world account to another virtual world account. In one example, virtual world query engine may coordinate the transferring or copying of an inventory item between virtual world accounts, as requested by the lobby management engine. Next, block 910 illustrates receiving an indicator of the status of the transfer or copy operation. Thereafter, block 912 depicts updating inventory directory index with the copy or transfer status, and the process ends.

In the example, at block 906, if the lobby management engine detects a request to view a particular item from the lobby GUI, then the process passes to block 914. Block 914 depicts converting the selected item for output in the virtual lobby viewer or a separate application if the viewer does not support viewing of the selected inventory item. Next, block 916 illustrates rendering the directory item within the viewer in the virtual lobby or automatically opening an application and opening the item in the application, and the process ends.

In the example, at block 906, if the lobby management engine detects a request to view one or more inventory items as if in a particular virtual world account, then the process passes to block 918. In one example, a user may request to preview a particular inventory item, while in the lobby, as the item will appear or run when in a particular virtual world. In another example, a user positioning an avatar to look at a mirror may trigger a request to view the user's avatar as the avatar would appear in the virtual world account associated with the mirror. Block 918 illustrates accessing the rendering specifications for the selected virtual world from the virtual world provider for the selected virtual world. Block 920 depicts converting one or more of the selected items for output in the virtual lobby as the items would be viewed in the selected virtual world according to the accessed rendering specifications. Block 922 illustrates rendering the converted items within the virtual lobby, and the process ends.

Figure 10:
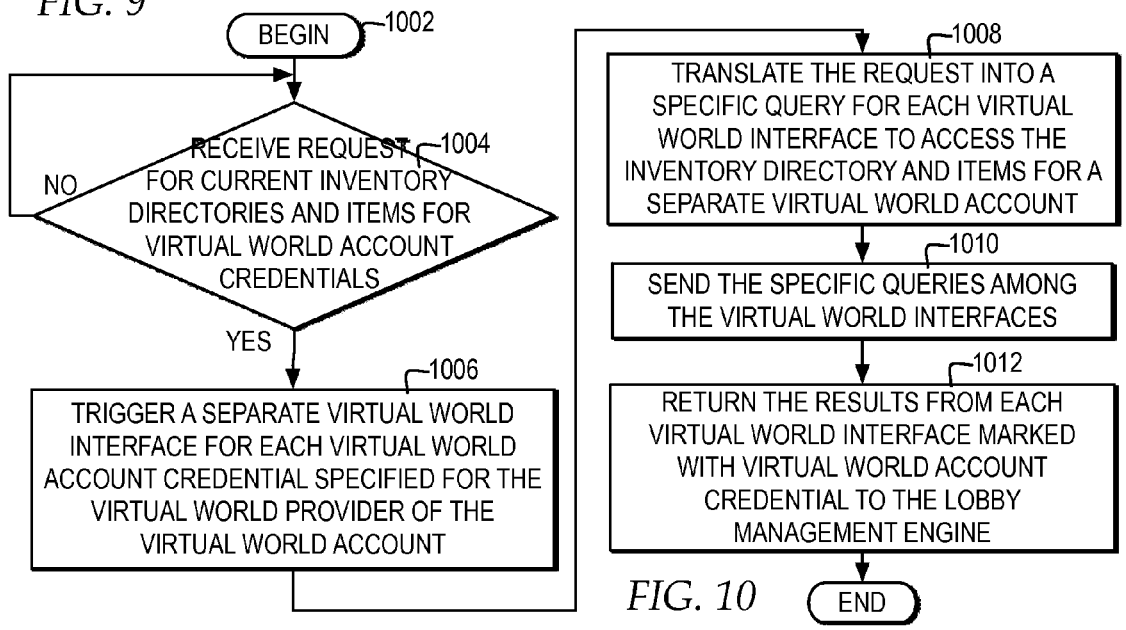
FIG. 10 is a high level logic flowchart illustrating a process and program for a virtual lobby client accessing inventory directories and items from across multiple virtual world accounts.

With reference now to FIG. 10, a high level logic flowchart depicts a process and program for a virtual lobby client accessing inventory directories and items from across multiple virtual world accounts. In the example, the process starts at block 1002 and thereafter proceeds to block 1004. Block 1004 illustrates a determination by the virtual world query engine whether a request is received for current inventory directories and items for virtual world account credentials. Block 1006 depicts triggering a separate virtual world interface for each virtual world account credential specified for the virtual world provider of the virtual world account. Next, block 1008 illustrates translating the request into a specific query for each virtual world interface to access the inventory directory and items for a separate virtual world account. Thereafter, block 1010 depicts distributing the specific queries among the virtual world interfaces. Next, block 1012 illustrates returning the results from each virtual world interface marked with the associated virtual world accounts credential to the lobby management engine, and the process ends.

Figure 11:
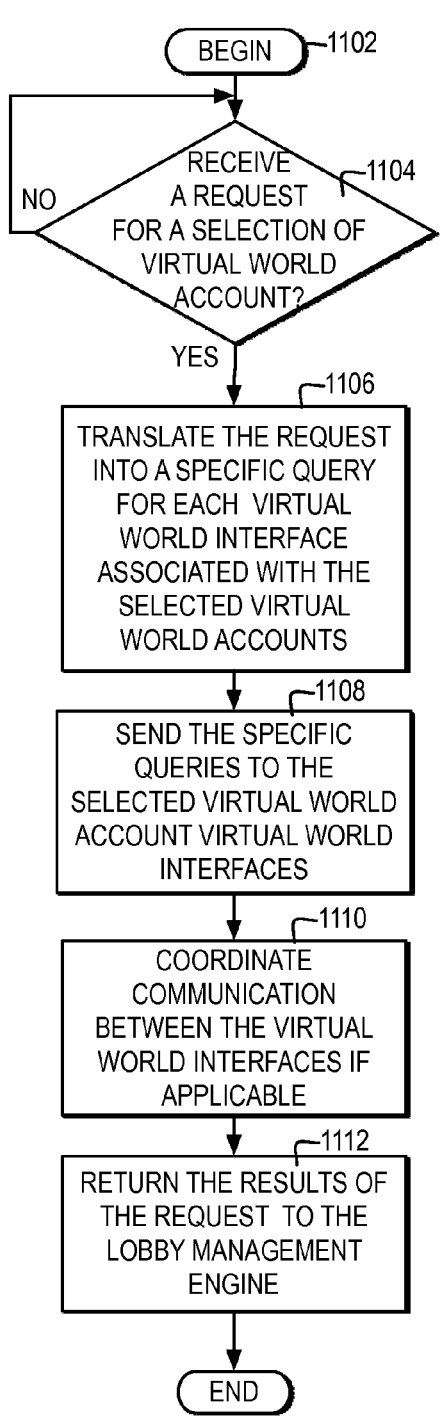
FIG. 11 is a high level logic flowchart depicting a process and program for a virtual lobby client managing requests from a lobby management engine to a virtual world query engine.

Referring now to FIG. 11, a high level logic flowchart illustrates a process and program for a virtual lobby client managing requests from a lobby management engine to a virtual world query engine. In the example, the process starts at block 1102 and thereafter proceeds to block 1104. Block 1104 illustrates a determination by the virtual world query engine whether a request for a selection of virtual world accounts is received. A selection of virtual world accounts may include a single virtual world account or multiple virtual world accounts. The request may include, for example, a request for the rendering specifications for a particular virtual world account, a request for automatically logging into a particular virtual world account, and a request to transfer or copy an item from one virtual world account to another virtual world account. Next, block 1106 depicts translating the request into a specific query for each virtual world interface associated with the selected virtual world accounts. Thereafter, block 1108 illustrates sending the specific queries to the selected virtual world account interfaces. Next, block 1110 depicts coordinating communication between the virtual world interfaces if applicable, such as for a transfer or copy of an inventory item from one virtual world account to another. Thereafter, block 1112 illustrates returning the results of the request to the lobby management engine, and the process ends.

Figure 12:
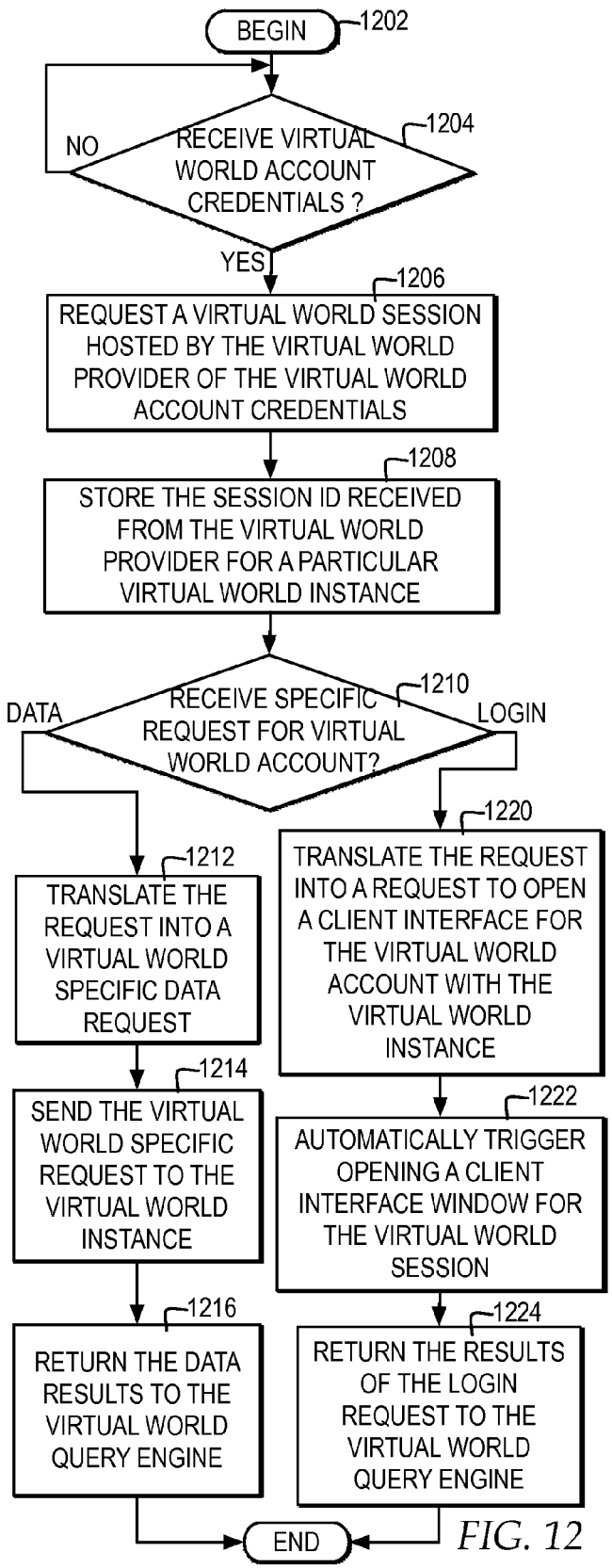
FIG. 12 is a high level logic flowchart illustrating a process and program for a virtual world interface of a virtual world client managing requests from a virtual world query engine.

With reference now to FIG. 12, a high level logic flowchart depicts a process and program for a virtual world interface of a virtual world client managing requests from a virtual world query engine. In the example, the process starts at block 1202 and thereafter proceeds to block 1204. Block 1204 illustrates a determination by a virtual world interface whether the virtual world interface has received virtual world account credentials. If the virtual world interface has received account credentials, then the process passes to block 1206. Block 1206 illustrates requesting a virtual world session hosted by the virtual world provider of the virtual world account credentials. Block 1208 depicts storing the session identifier (ID) returned from the virtual world provider for access to a particular virtual world instance for the virtual world account credentials. Next, block 1210 illustrates a determination when the virtual world interface receives a request for interacting with the virtual world account, what type of request is received.

At block 1210, if the virtual world interface receives a data request, then the process passes to block 1212. Block 1212 illustrates translating the request into a virtual world specific data request. Next, block 1214 depicts sending the virtual world specific request to the virtual world instance. Thereafter, block 1216 illustrates returning the data results from the virtual world instance to virtual world query engine, and the process ends.

At block 1210, if the virtual world interface receives a login request, then the process passes to block 1220. Block 1220 illustrates translating the login request into a request to open a client interface for the session with the virtual world instance. Next, block 1222 depicts automatically triggering the opening of a client interface window for the virtual world session for the virtual world account. Thereafter, block 1224 illustrates returning the results of the login request to the virtual world query engine, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing, from a single lobby interface, a plurality of virtual world accounts, the method comprising:
   a computer automatically interfacing with a plurality of virtual world instances, each provided by a separate virtual world provider from among a plurality of virtual world providers, each interfaced with to access a separate one from among the plurality of virtual world accounts, to retrieve a separate selection of the inventory items from each of the plurality of virtual world accounts;
   the computer rendering an inventory directory index of each separate selection of inventory items collectively within the single lobby interface of the computer with at least one selectable option for managing each of the items in the inventory directory index from the single lobby interface; and the computer rendering within the single lobby interface a plurality of simultaneously accessible graphical portals comprising a separate graphical portal for each of the plurality of virtual accounts, wherein entry of each of the separate graphical portals from the single lobby interface triggers the computer to automatically open a virtual world specific interface window into a particular virtual world instance from among the plurality of virtual world instances provided under the particular virtual world account associated with the entered graphical portal; and wherein each user of each of the plurality of virtual world accounts provides separate account authorization information for each virtual world account with which the user interacts, and interacts via a user-specific avatar, with inventory items associated with each of the plurality of virtual world accounts.

2. The method according to claim 1, further comprising:

responsive to a user positioning an avatar within the single lobby interface to enter a particular graphical portal from among the plurality of graphical portals, managing, by the computer, automatically opening the virtual world specific interface window into a particular virtual world instance from among the plurality of virtual world instances for the particular virtual world account associated with the entered particular graphical portal, wherein the virtual world specific interface window is automatically logged into the particular virtual world account; and updating, by the computer, the rendering of the entered particular graphical portal within the single lobby interface to indicate user entry into the particular virtual world.

3. The method according to claim 2, further comprising:

automatically opening the virtual world specific interface window by performing at least one of opening the virtual world specific interface window within the single lobby interface and triggering a virtual world provider client specified for the particular virtual world provider to open the virtual world specific interface window separate from the single lobby interface.

4. The method according to claim 1, wherein the computer rendering the inventory directory index of each separate selection of inventory items collectively within a single lobby interface of the computer with at least one selectable option for managing each of the items in the inventory directory from the single lobby interface further comprises:

setting, by the computer, for each of the plurality of items, a separate sharing option comprising a transfer option and a copy option, for specifying how each of the plurality of items can be shared between a first particular virtual world account of a user to a second particular virtual world account of the user;

rendering the inventory directory index with each of the plurality of items graphically marked with the separate sharing option within the single lobby interface; and responsive to the user selecting a particular item from among the plurality of items within the inventory directory index, setting the at least one selectable option for managing the particular item to the separate sharing option for the particular item.

5. The method according to claim 1, further comprising:

the computer rendering the inventory directory index with the at least one selectable option for managing each of the plurality of items rendered as a selectable viewing option;

the computer, responsive to a user selection of a selected item from among the inventory directory index and the selectable viewing option, converting the selected item for output within the single lobby interface; and the computer performing at least one of rendering the converted selected item within a viewer interface within the single lobby interface and invoking a separate application and opening the converted selected item within the separate application.

6. The method according to claim 1, further comprising:

rendering, by the computer, a particular graphical portal from among the plurality of graphical portals as a mirror which when a user positions an avatar within the single lobby interface to look at the mirror, the computer renders a reflection of the avatar in the mirror as the avatar would appear within a particular virtual world instance interfacing with the particular virtual world account associated with the particular graphical portal; and responsive to detecting the avatar positioned to look in the particular graphical portal,
  accessing by the computer a rendering specification from the particular virtual world instance for the particular virtual world account;
  converting at least one particular inventory item retrieved from the particular virtual world account for rendering according to the rendering specification; and
  rendering the reflection of the avatar in the mirror to reflect the avatar with the at least one particular inventory item.

7. The method according to claim 1, further comprising:

selecting at least one separate keyword for each of the plurality of inventory items located within at least one of each file retrieved for each of the plurality of inventory items and at least one database accessible via a network for indexing keywords for at least one of the plurality of inventory items;

assigning the at least separate keyword to each of the plurality of inventory items in the lobby database; displaying a search option within the single lobby interface;

responsive to a user entry of a search term and selection of the search option, searching the lobby database with the search term; and rendering a search result selection of items stored with at least one keyword matching the search term from the lobby database.

8. A computer system for managing a plurality of virtual world accounts, from a single lobby interface, the computer system comprising:

one or more processors;

one or more computer-readable tangible storage devices;

program instructions, stored on at least one of the one or more storage devices for execution by at least one of said one or more processors, to automatically interface with a plurality of virtual world instances through a plurality of virtual world interfaces of the computer system, each of the plurality of virtual world instances provided by a separate virtual world provider from among a plurality of virtual world providers, each interfaced with through one of the plurality of virtual world interfaces to access a separate one from among a plurality of virtual world accounts to retrieve a separate selection of inventory items from each of the plurality of virtual world accounts;

program instructions, stored on at least one of the one or more storage devices for execution by at least one of said one or more processors, to render the inventory directory index of each separate selection of inventory items collectively within a single lobby interface of the computer system with at least one selectable option for managing each of the items in the inventory directory from the single lobby interface;

program instructions, stored on at least one of the one or more storage devices for execution by at least one of said one or more processors, to control rendering within the single lobby interface a plurality of simultaneously accessible graphical portals comprising of a separate graphical portal for each of the plurality of virtual accounts, wherein entry of each of the separate graphical portals from the single lobby interface triggers the computer system to automatically open a virtual world specific interface window into a particular virtual world instance from among the plurality of virtual world instances provided under the particular virtual world account associated with the entered graphical portal; and wherein each user of each of the plurality of virtual world accounts provides separate account authorization information for each virtual world account with which the user interacts, and interacts via a user-specific avatar, with inventory items associated with each of the plurality of virtual world accounts.

9. The computer system according to claim 8, further comprising:

program instructions, stored on at least one of the one or more storage devices for execution by at least one of said one or more processors, responsive to a user positioning an avatar within the single lobby interface to enter a particular graphical portal from among the plurality of graphical portals, to manage automatically opening the virtual world specific interface window into a particular virtual world instance from among the plurality of virtual world instances for the particular virtual world account associated with the entered particular graphical portal, wherein the virtual world specific interface window is automatically logged into the particular virtual world account; and program instructions, stored on at least one of the one or more storage devices for execution by at least one of said one or more processors, to update the rendering of the entered particular graphical portal by a lobby graphical user interface to indicate user entry into the particular virtual world.

10. The computer system according to claim 9, further comprising:

program instructions, stored on at least one of the one or more storage devices for execution by at least one of said one or more processors, to automatically open the virtual world specific interface window by performing at least one of opening the virtual world specific interface window within the single lobby interface and triggering a virtual world provider client specified for the particular virtual world provider to open the virtual world specific interface window separate from the single lobby interface.

11. The computer system according to claim 8, wherein the program instructions to render the inventory index further comprise:

program instructions to set, for each of the plurality of items, a separate sharing option comprising a transfer option and a copy option, for specifying how each of the plurality of items can be shared between a first particular virtual world account of a user to a second particular virtual world account of the user;

program instructions to render the inventory directory index with each of the plurality of items graphically marked with the separate sharing option within the single lobby interface; and program instructions, responsive to a user selecting a particular item from among the plurality of items within the inventory directory index, to set the at least one selectable option for managing the particular item to the separate sharing option for the particular item.

12. The computer system according to claim 8, further comprising:

program instructions, stored on at least one of the one or more storage devices for execution by at least one of said one or more processors, to render the inventory directory index with the at least one selectable option for managing each of the plurality of items rendered as a selectable viewing option;

program instructions, stored on at least one of the one or more storage devices for execution by at least one of said one or more processors, responsive to a user selection of a selected item from among the inventory directory index and the selectable viewing option, to convert the selected item for output within the single lobby interface; and program instructions, stored on at least one of the one or more storage devices for execution by at least one of said one or more processors, to perform at least one of rendering the converted selected item within a viewer interface within the single lobby interface and invoking a separate application and opening the converted selected item within the separate application.

13. The computer system according to claim 8, further comprising:

program instructions, stored on at least one of the one or more storage devices for execution by at least one of said one or more processors, to render a particular graphical portal from among the plurality of graphical portals as a mirror which when a user positions an avatar within the single lobby interface to look at the mirror, the computer system renders a reflection of the avatar in the mirror as the avatar would appear within a particular virtual world instance interfacing with the particular virtual world account associated with the particular graphical portal; and program instructions, stored on at least one of the one or more storage devices for execution by at least one of said one or more processors, to access a rendering specification from the particular virtual world instance for the particular virtual world account;

program instructions, stored on at least one of the one or more storage devices for execution by at least one of said one or more processors, to convert at least one particular inventory item retrieved from the particular virtual world account for rendering according to the rendering specification; and program instructions, stored on at least one of the one or more storage devices for execution by at least one of said one or more processors, to render the reflection of the avatar in the mirror to reflect the avatar with the at least one particular inventory item.

14. The computer system according to claim 8, further comprising:
program instructions, stored on at least one of the one or more storage devices for execution by at least one of said one or more processors, to select at least one separate keyword for each of the plurality of inventory items located within at least one of each file retrieved for each of the plurality of inventory items and at least one database accessible via a network for indexing keywords for at least one of the plurality of inventory items;
program instructions, stored on at least one of the one or more storage devices for execution by at least one of said one or more processors, to assign the at least separate keyword to each of the plurality of inventory items in the lobby database;
program instructions, stored on at least one of the one or more storage devices for execution by at least one of said one or more processors, to display a search option within the single lobby interface; program instructions, stored on at least one of the one or more storage devices for execution by at least one of said one or more processors, responsive to a user entry of a search term and selection of the search option, to search the lobby database with the search term; and
program instructions, stored on at least one of the one or more storage devices for execution by at least one of said one or more processors, to render a search result selection of items stored with at least one keyword matching the search term from the lobby database.

15. A computer program product for managing, from a single lobby interface, a plurality of virtual world accounts, the computer program product comprising:
one or more computer-readable tangible storage devices;
program instructions, stored on at least one of the one or more storage devices, to automatically interface with a plurality of virtual world instances, each provided by a separate virtual world provider from among a plurality of virtual world providers, each interfaced with to access a separate one from among the plurality of virtual world accounts, to retrieve a separate selection of the inventory items from each of the plurality of virtual world accounts;
program instructions, stored on at least one of the one or more storage devices, to render the inventory directory index of each separate selection of inventory items collectively within the single lobby interface of the computer with at least one selectable option for managing each of the items in the inventory directory from the single lobby interface; and
program instructions, stored on at least one of the one or more storage devices, to render within the single lobby interface a plurality of simultaneously accessible graphical portals comprising a separate graphical portal for each of the plurality of virtual accounts, wherein entry of each of the separate graphical portals from the single lobby interface triggers the computer to automatically open a virtual world specific interface window into a particular virtual world instance from among the plurality of virtual world instances provided under the particular virtual world account associated with the entered graphical portal; and
wherein each user of each of the plurality of virtual world accounts provides separate account authorization information for each virtual world account with which the user interacts, and interacts, via a user-specific avatar, with inventory items associated with each of the plurality of virtual world accounts.

16. The computer program product according to claim 15, the computer program product further comprising:
program instructions, stored on at least one of the one or more storage devices, responsive to a user positioning an avatar within the single lobby interface to enter a particular graphical portal from among the plurality of graphical portals, to manage automatically opening the virtual world specific interface window into a particular virtual world instance from among the plurality of virtual world instances for the particular virtual world account associated with the entered particular graphical portal, wherein the virtual world specific interface window is automatically logged into the particular virtual world account; and
program instructions, stored on at least one of the one or more storage devices, to update the rendering of the entered particular graphical portal to indicate user entry into the particular virtual world.

17. The computer program product according to claim 16, the computer program product further comprising:
program instructions, stored on at least one of the one or more storage devices, to automatically open the virtual world specific interface window by performing at least one of opening the virtual world specific interface window within the single lobby interface and triggering a virtual world provider client specified for the particular virtual world provider to open the virtual world specific interface window separate from the single lobby interface.

18. The method of claim 1, wherein each user of each of the plurality of virtual world accounts interacts, via a different user-specific avatar for each virtual world account, with inventory items associated with each of the plurality of virtual world accounts.

19. The computer program product of claim 15, wherein each user of each of the plurality of virtual world accounts interacts, via a different user-specific avatar for each virtual world account, with inventory items associated with each of the plurality of virtual world accounts.

* * * * *